Feb. 11, 1930.  R. W. BUNGE ET AL  1,746,885
ROTARY BLOWER AND METHOD OF CONTROLLING OPERATION OF THE SAME
Filed May 14, 1926  4 Sheets-Sheet 3
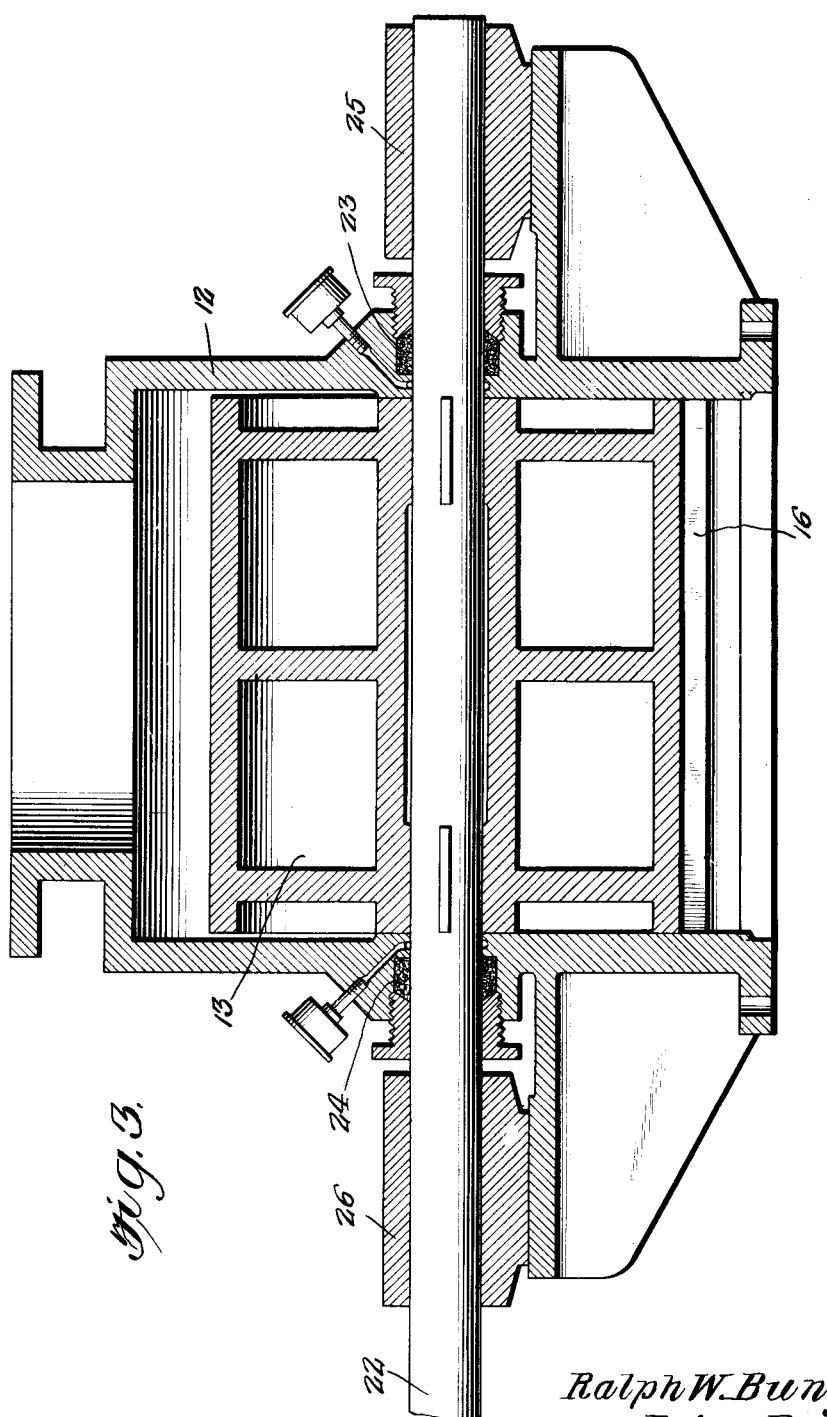

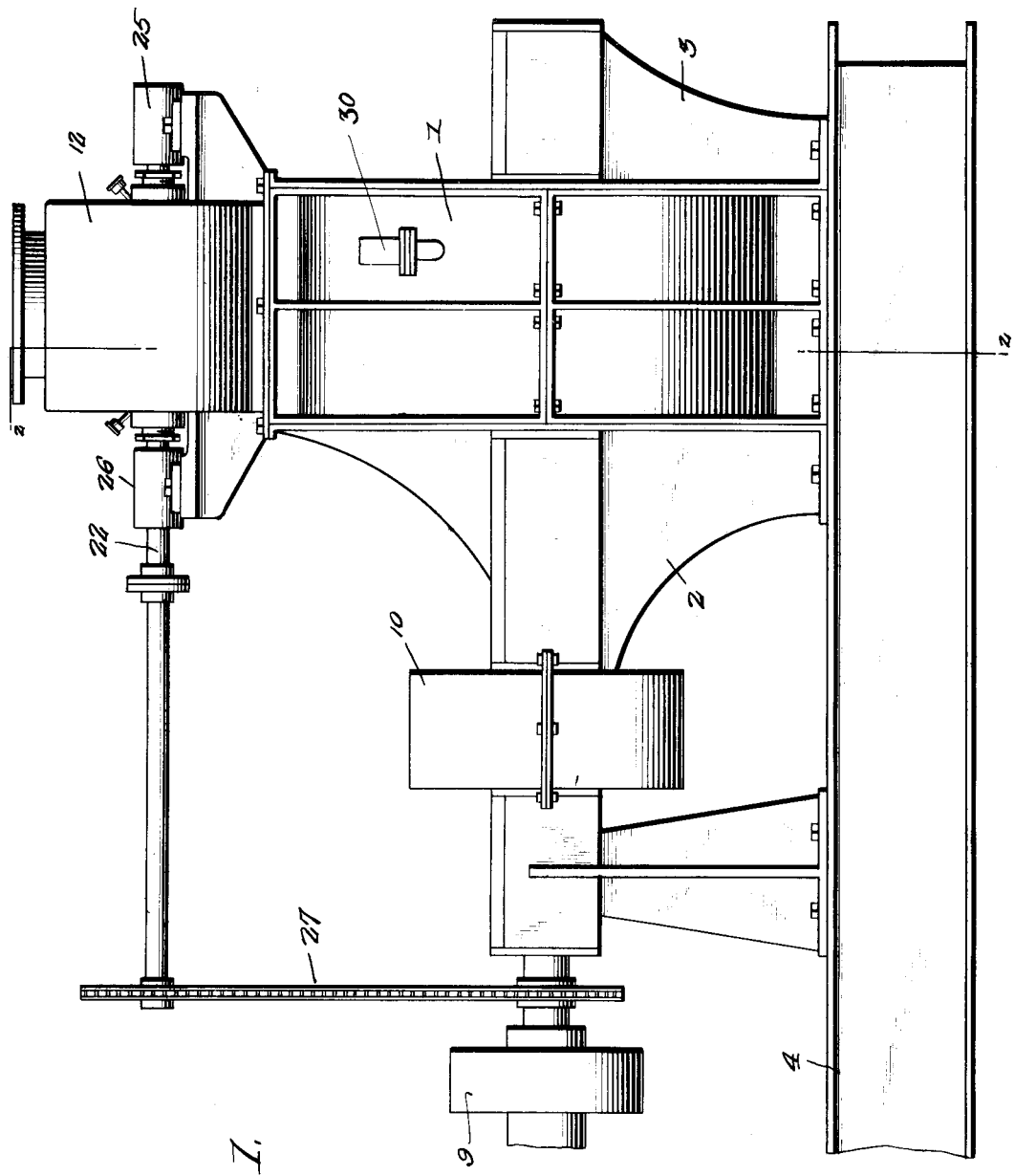
Fig. I.
Inventor
Ralph W. Bunge,
Peter Das,
By Earl T. Ragan
Attorney

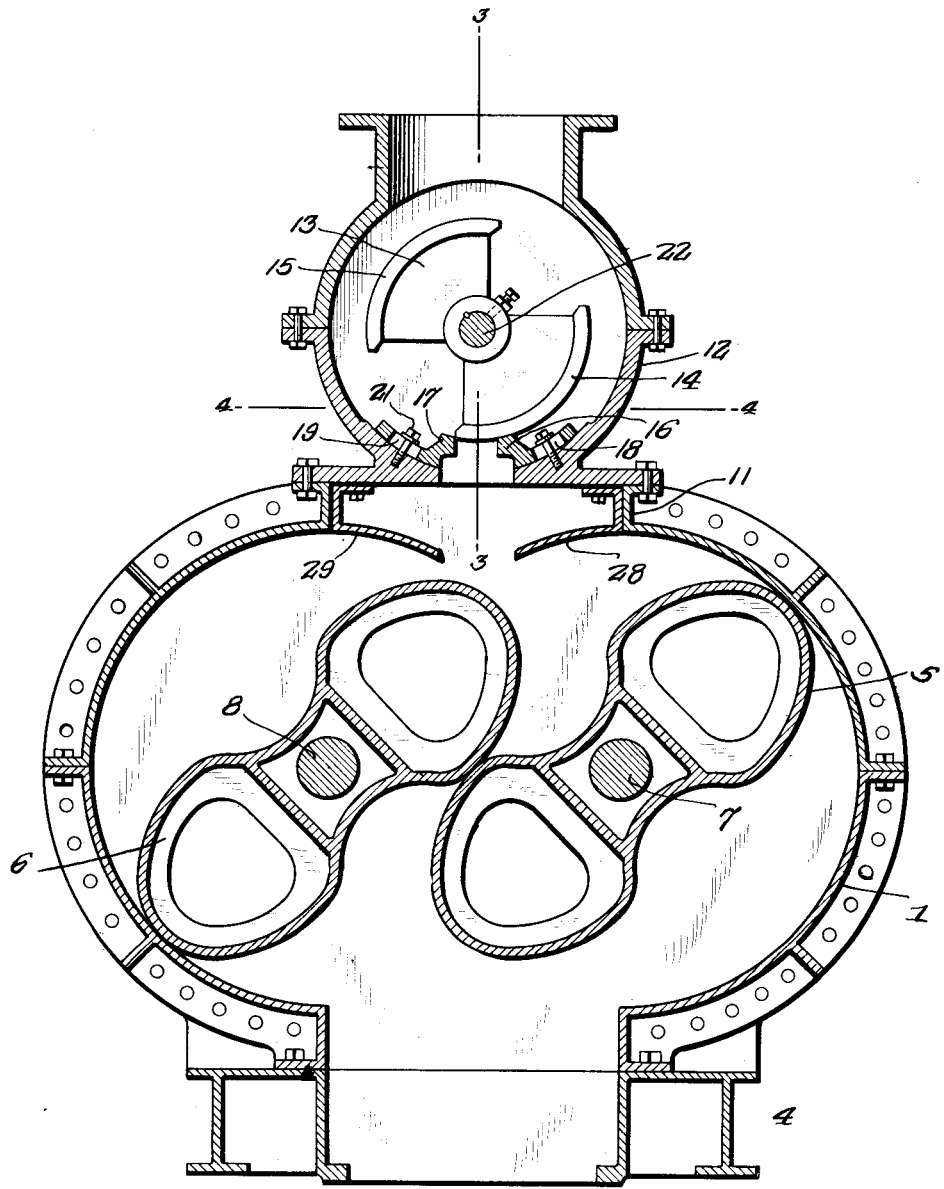

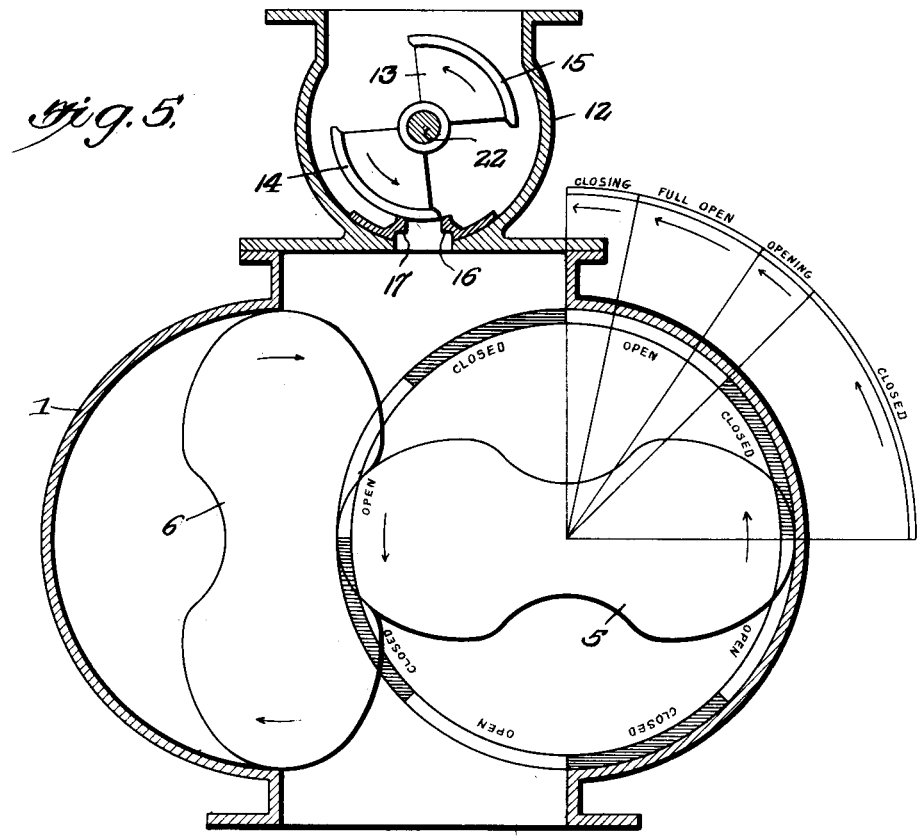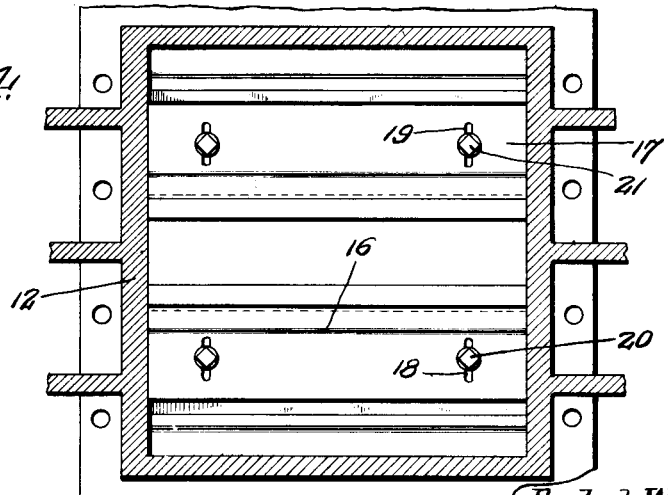

Patented Feb. 11, 1930

1,746,885

UNITED STATES PATENT OFFICE

RALPH W. BUNGE, OF CHICAGO, AND PETER DAS, OF OAK PARK, ILLINOIS, ASSIGNORS, BY MESNE ASSIGNMENTS, TO STANDARD BRANDS INCORPORATED, OF DOVER, DELAWARE, A CORPORATION OF DELAWARE

ROTARY BLOWER AND METHOD OF CONTROLLING OPERATION OF THE SAME

Application filed May 14, 1926. Serial No. 109,113.

Our invention relates in general to improvements in blowers of the so-called rotary impeller type and relates to improvements for increasing the efficiency of blowers of this type and particularly for practically eliminating back pressure or return flow from the discharge pipe of a blower of this type into the impeller chamber.

In a preferred specific embodiment of our invention, which will be hereinafter described in detail, our invention involves a blower of the rotary impeller type in combination with a discharge regulating valve so constructed as to provide free or adequate egress of air or other gas from the impeller chamber, when the gas pressure within this chamber adjacent the discharge outlet therefrom is greater than the gas pressure in the discharge pipe, and to cut off and prevent return flow from the discharge pipe into the adjacent portion of the impeller chamber when the pressure within the latter is less than the pressure within the adjacent portion of the discharge pipe.

In its specific preferred embodiment, as described, our invention involves the placement of a valve, preferably a mechanically operated and suitably timed rotary valve, in such a position as to control the discharge from a blower of the impeller type in a manner which will hereinafter be fully described.

In the accompanying drawings, illustrative of a preferred form of our invention:

Figure 1 is a view in elevation of a blower provided with a discharge valve and with a synchronizing drive for suitably timing the operation of the discharge valve;

Figure 2 is a cross-sectional view of the blower taken along the line 2—2 as indicated in Figure 1;

Figure 3 is a vertical sectional view taken along the line 3—3 as indicated in Figure 2 and showing a preferred form of construction and mounting of the rotary discharge valve;

Figure 4 is a view partly in cross-section and partly in plan view taken along the line 4—4 as indicated in Figure 2;

Figure 5 is a view partly in vertical cross-section and partly in diagrammatic representation, indicating a preferred timing or synchronizing of the discharge valve on the blower with respect to the positions of the impellers at different points of their rotation.

Referring in detail to the drawings, 1 represents a casing which may be mounted upon suitable supports 2, 3, which may be secured to a base 4, or otherwise suitably positioned. Within the casing 1 are mounted two impellers 5, 6 which may be of usual and well-known form and construction and which are mounted for rotation upon parallel axes 7, 8 suitably journaled in the side walls of the impeller casing 1, or in adjacent supports. One of the shafts 7, 8 may be driven by power, such for example as by power applied to a pulley 9, mounted on this shaft and the two impellers are rotated at equal speed and in opposite directions in any well-known, usual, or convenient manner such, for example, as by means of intermeshing gears mounted respectively on the shafts 7, 8 and which may be enclosed within a gear box 10.

Heretofore, in the construction of blowers of this type, it has been usual to mount the discharge pipe of the blower directly and openly upon the outlet 11 of the impeller casing, depending entirely upon the operation of the impellers themselves to control the flow of gas between the impeller casing and the discharge pipe. We have found that blowers of such previously well-known construction are undesirably inefficient by reason of the fact that at a certain position of the impellers within the casing, after they have built up their maximum gas pressure adjacent the discharge outlet of the casing, the pressure at this locality within the impeller casing then falls somewhat below the pressure already built up within the adjacent portion of the discharge pipe and a back-flow of the gas, therefore, occurs from the discharge pipe into the impeller casing during certain intervals in each rotation of the impellers. To preclude such back-flow is a main purpose of our present invention and, to accomplish this purpose, in the form of our invention at present preferred, and which is the best form of our invention known to us, a valve casing 12 is mounted upon the outlet of the impeller chamber and within this casing a valve is placed, so constructed as to positively control the flow of gas through the discharge outlet of the impeller casing. Preferably this valve may be a rotary valve 13, including segments 14, 15 positioned to move in close fit with a valve seat adjacent the discharge outlet from the impeller casing. Preferably, and as clearly illustrated in Figures 2 and 4, this valve seat comprises two parallel portions 16, 17 each having an upper surface portion curved to conform with the peripheral curved surface portions of the rotating valve itself and to secure a close fit therewith. These portions 16, 17 may advantageously be provided with slots 18, 19 through which retaining screws 20, 21 pass and by means of which the valve portions may be adjusted to and from each other to regulate the width and area of the discharge opening from the blower casing into the valve chamber.

The rotary valve 13 may be mounted upon a central shaft 22 passing through packing glands 23, 24 in the sides of the valve casing 12 and supported in bearings 25, 26 outside the valve casing. The shaft 22 in the construction illustrated is driven at twice the speed of the shafts 7, 8, upon which the impellers are mounted and, for this purpose as shown in Figure 1, a driving chain 27 may be provided inter-connecting sprocket wheels of suitable size upon the shaft 22 and upon one of the impeller shafts 7 or 8.

The segments 14, 15 are of such arcuate extent and their position, with respect to the valve seat portions with which they coact, and with respect to the position of the impellers at different points in the rotation of the latter is so synchronized that after the impellers have attained such a position as to create a maximum gas pressure in the impeller casing adjacent its discharge outlet and, when, thereafter, during a further brief interval in the rotation of the impellers, a reduction of pressure occurs within the impeller casing and adjacent its discharge outlet, one of the segments of the rotary valve will close the outlet at such an instant as to cut off any possible back-flow of gas into the impeller casing, through the discharge outlet, and this outlet will be kept closed by the valve segment in operative position until approximately such instant as the impellers, in their still further rotation, have again built up a pressure within the impeller casing adjacent this discharge outlet which is in excess of the pressure in the valve casing and discharge pipe.

Although the precise timing of the discharge control valve may be varied somewhat with different blowers, depending somewhat upon the dimensions, speed and capacity of the blower, in usual practice the timing of the discharge control valve may be approximately as diagrammatically illustrated in Figure 5 of the drawings, in which figure is illustrated, superposed upon an outline of one of the impellers, a diagram indicating the operative position of the discharge control valve for each position of the impeller during its rotation. With respect to valve positions and arcuate impeller positions, this diagram is drawn approximately to scale and the radial lines of the valve position diagram indicate successive positions of the longitudinal axial line of the impeller, superposed on the diagram, during a single valve cycle, there being (in the preferred embodiment of our invention as illustrated) four such valve cycles for each complete rotation of the impellers. Ordinarily the dimensions and timing of the discharge-control valve will be so proportioned and adjusted, in accord with the dimensions of the blower and its conditions of operation, that the valve will close just before the pressure in the blower falls below that in the adjacent portion of the discharge pipe and will open again when approximately the same pressure differential is attained after intervening fall and rise of pressure in the impeller casing adjacent the discharge outlet.

The efficiency of a blower of the type described may be somewhat further improved by providing the side walls of the impeller casing with extensions 28, 29 as shown in Figure 2, which are of the same curvature as the side walls of the impeller casing and are positioned to make similar close clearance with the ends of the impellers as the latter rotate. These extensions have the beneficial effect of providing for higher compression and reducing the time interval during which backflow into the impeller casing tends to occur. Such arcuate extensions should be sufficient to reduce to a minimum the space between the outlet valve and impellers at the impeller position of greatest compression in the impeller casing adjacent the outlet therefrom. Ordinarily, the area of the opening between such extensions will be approximately the same as the maximum effective outlet opening utilized from the impeller casing into the discharge pipe, that is approximately the same as the maximum outlet opening of the discharge valve utilized.

In one embodiment of our invention, given merely by way of example, it may be applied to a rotary impeller blower having impellers approximately 31 7/64 inches long from end to end and an impeller width (along the axial line of the impellers) of 18 inches, such a blower having a distance from center to center of the impeller shafts of 20 inches and having a discharge pipe 12 inches in diameter. In the operation of a rotary impeller blower of these dimensions, at a speed of about 325 R. P. M. (this being the speed of rotation of the impellers), such a blower has an air discharge capacity of approximately 2600 cu. ft. per minute and with a blower of this size and speed, a distance of three (3) inches between the segments 16, 17 of the valve seat and a valve port length along these segments of 17 1/2 inches and a valve timing in accordance with the diagrammatic representation, shown in Figure 5 of the drawings are suitable. In this valve timing the valve may remain in closed position during one-eighth of a rotation of the impellers; may consume one thirty-second of a rotation of the impellers during the opening of the valve; may remain in fully opened position during one-sixteenth of a rotation and may occupy the same time in closing as in opening, namely one thirty-second of the rotation time of the impellers.

In the preferred embodiment of our invention, as illustrated in Figure 1, a safety valve 30 is placed upon the compression portion of the blower 1, which will serve to safeguard the blower against possible damage from undue internal pressure from any cause, for example in case of breakage of the valve-driving mechanism or similar accident, which might leave the discharge control valve in closed position while the impellers continue to operate.

We do not, of course, restrict ourselves to blowers of any particular specific dimensions, speeds or capacities, nor to the specific construction which we have described as a preferred embodiment of our invention, since various changes might be made in such construction without departing from the essential features of our invention as pointed out in our claims hereto appended.

Having thus described our invention, what we claim and desire to protect by Letters Patent is:

1. In combination with a rotary blower of the impeller type, having an impeller casing, impellers therein and a discharge pipe therefrom, a control valve positioned between the impeller casing outlet and the discharge pipe, said valve being synchronized with the impeller drive mechanism to close the outlet from the impeller casing into the discharge pipe at approximately the instant of such volumetric increase in the space between the impellers adjacent the outlet that back-flow into the casing would tend to occur and to maintain the outlet closed until the pressure in the impeller casing, adjacent the outlet, after fall and rise of such pressure due to the rotation of the impellers, subsequent to said closure of the outlet valve, is again at least approximately as high as the pressure within the discharge pipe immediately exterior of the valve.

2. In combination with a rotary blower of the impeller type, having an impeller casing, impellers therein and a discharge pipe therefrom, a control valve positioned between the impeller casing outlet and the discharge pipe, said valve being mechanically synchronized with the impeller drive mechanism to close the outlet from the impeller casing into the discharge pipe at approximately the instant of such volumetric increase in the space between the impellers adjacent the outlet that back-flow into the casing would tend to occur and to maintain the outlet closed until the pressure in the impeller casing, adjacent the outlet, after fall and rise of such pressure due to the rotation of the impellers, subsequent to said closure of the outlet valve, is again at least approximately as high as the pressure within the discharge pipe immediately exterior of the valve.

3. In combination with a rotary blower of the impeller type, having an impeller casing, impellers therein and a discharge pipe therefrom, a rotary control valve positioned between the impeller casing outlet and the discharge pipe, said valve being synchronized with the impeller drive mechanism to close the outlet from the impeller casing into the discharge pipe at approximately the instant of such volumetric increase in the space between the impellers adjacent the outlet that back-flow into the casing would tend to occur and to maintain the outlet closed until the pressure in the impeller casing, adjacent the outlet, after fall and rise of such pressure due to the rotation of the impellers, subsequent to said closure of the outlet valve, is again at least approximately as high as the pressure within the discharge pipe immediately exterior of the valve.

4. In combination with a rotary blower of the impeller type, having an impeller casing, impellers therein and a discharge pipe therefrom, a rotary control valve positioned between the impeller casing outlet and the discharge pipe, said valve being mechanically synchronized with the impeller drive mechanism to close the outlet from the impeller casing into the discharge pipe at approximately the instant of such volumetric increase in the space between the impellers adjacent the outlet that back-flow into the casing would tend to occur and to maintain the outlet closed until the pressure in the impeller casing, adjacent the outlet, after fall and rise of such pressure due to the rotation of the impellers, subsequent to said closure of the outlet valve, is again at least approximately as high as the pressure within the discharge pipe immediately exterior of the valve.

5. In combination with a blower of the rotary impeller type having an impeller casing, impellers therein and a discharge pipe therefrom, means positively synchronized with the impellers for periodically opening and closing communication between the impeller casing and the discharge pipe as the pressure within the impeller casing adjacent the outlet therefrom into the discharge pipe rises and falls during each rotation of the impellers.

6. In combination with a blower of the rotary impeller type having an impeller casing, impellers therein and a discharge pipe therefrom, mechanically operated means for periodically opening and closing communication between the impeller casing and the discharge pipe as the pressure within the impeller casing adjacent the outlet therefrom into the discharge pipe rises and falls during each rotation of the impellers.

7. In combination with a blower of the rotary impeller type having an impeller casing, impellers therein and an outlet and a discharge pipe therefrom, means including a rotary valve positioned between the outlet of the impeller casing and the discharge pipe, said rotary valve being positively synchronized to periodically open and close as the pressure in the impeller casing adjacent the outlet therefrom into the discharge pipe rises and falls at cyclic intervals during each rotation of the impellers, said rotary valve having a coacting seat opening of adjustable width.

8. In combination with a blower of the rotary impeller type having an impeller casing, impellers therein and an outlet and a discharge pipe therefrom, incurved arcuate extensions of the impeller casing walls having the same curvature as that of the walls and extending from the latter over a portion of the outlet, and a discharge control valve positioned between such arcuate extensions and the discharge pipe.

9. In combination with a rotary blower of the impeller type, having an impeller casing, impellers therein and a discharge pipe therefrom, means positively synchronized in its movement with the movement of the impellers positioned between the casing outlet and the discharge pipe positively preventing back-flow from the discharge pipe into the impeller casing during the normal operation of the blower.

In testimony whereof, we affix our signatures.

RALPH W. BUNGE.
PETER DAS.